United States Patent Office 2,944,948
Patented July 12, 1960

2,944,948
METHOD OF PURIFYING ORGANOMETALLIC COMPLEXES AND THEIR USE IN THE PREPARATION OF ORGANOLEAD COMPOUNDS

Albert P. Giraitis, Baton Rouge, La., assignor to Ethyl Corporation, New York, N.Y., a corporation of Delaware No Drawing. Filed Feb. 6, 1956, Ser. No. 563,422

7 Claims. (Cl. 204—59)

This invention is concerned with a process for the purification of organometallic materials, in particular impure or contaminated organometallic complexes. The invention is more particularly concerned in certain embodiments with an improved process for the manufacture of alkyllead compounds, and other organolead compounds.

A leading alkyllead product is tetraethyllead, which has been known for quite some time as a highly effective antiknock for motor fuels. The process employed in present commercial practice is generally satisfactory. It is carried out by reacting ethyl chloride with sodium-lead alloy of the composition NaPb, or monosodium-lead alloy. Only about 22% of the lead in the alloy is converted to tetraethyllead. This process thus experiences some disadvantages, in particular, about 75% of the lead is not alkylated and must be recovered and reprocessed.

More recently new processes have been developed for the production of alkyllead compounds, particularly tetraethyllead, which involve the electrolysis of an organometallic compound such as triethylaluminum, employing a lead anode. This process is particularly significant in that essentially 100% conversion of the lead can be achieved. In order to render the triethyl aluminum electrically conducting, it has been found that the presence of an ionizable salt is particularly advantageous, an organometallic complex being formed. However, in this process one drawback is that the current efficiencies are low and the desired product does not form until a considerable lapse of time has expired in the electrolysis. In other words, after applying current to the reaction mixture, the current is not immediately utilized to form the product. Instead an extended period of current application is required before the desired alkyllead product is released. This period of non-productive current transmittal is a significant handicap to the effectiveness of the process, increasing the unit current consumption and also reducing the capacity of any specific installation. It has now been discovered that the organometallic complexes of the electrolyte tend to become degraded or impure, especially when inadvertent exposure to oxygen occurs. It is believed that the electrolyte complexes become contaminated with oxidized product materials or compounds. In any event, a great need exists for an effective procedure to purify organometallic complexes and particularly to purify and upgrade such complexes to enhance their suitability for electrolytic operations as above described.

It is therefore an object of this invention to provide a novel process for the purification of organometallic materials, particularly electrolytes containing an organometallic compound and an ionizable salt complexed therewith. Another object is to provide an improved process for the manufacture of organolead compounds. Particularly, an object of this invention is to improve upon the most recent processes involving the electrolysis of an electrolyte containing a complex of an organometallic compound and an ionizable salt. A still further object is to overcome the delay period, especially in such a process wherein tetraethyllead is produced.

To these ends the surprising discovery has now been made that organometallic complexes containing organometallic oxidation contaminants can be purified by treating them with a liquid solvent having solubility for the organometallic oxidation contaminants therein and which is essentially immiscible with the organometallic complex. In the process of this invention the treatment comprises intimately contacting the organometallic complex with the solvent and forming a solvent or extract phase. This immiscible layer is then separated from the treated liquid. Numerous extractants can be employed although the liquid organometallic compounds and aliphatic hydrocarbons are generally used. The extraction is carried out at a temperature below the decomposition temperature of the materials. The process is particularly applicable to electrolytes comprising an organometallic compound complexed with an ionizable salt. The process of this invention results in purified electrolytes which are particularly suitable in processes where organolead compounds are produced by passing an electrolytic current through a lead anode and an electrolyte comprising a complex of an organometallic compound and an ionizable salt. Therefore, one embodiment of this invention comprises extracting an electrolyte comprising a complex of an organometallic compound and an ionizable salt with a liquid extractant having solubility for contaminants therein and being essentially immiscible with the electrolyte, then electrolyzing the electrolyte by passing an electric current through a lead anode and the electrolyte. The preferred electrolyte is the complex formed from triethyl aluminum and sodium fluoride and tetraethyllead is the preferred extractant.

By the process of this invention a particular advantage achieved is that organometallic materials contaminated with oxidization products and probably other contaminants are purified by an efficient and economical technique. The purified products are particularly advantageous when employed in the electrolysis described above in that greater current efficiencies are realized and the delay periods previously experienced are essentially eliminated. Thus considerable saving in current expenditures is realized, likewise a greater throughput per unit time is achieved, and production delays are minimized.

The extractants employed in the process of this invention are generally liquid materials having solubility for partially oxidized contaminants and which are essentially immiscible wth the electrolyte employed. The extractants which are normally employed are the liquid aliphatic hydrocarbons or organometallic compounds which do not have a greater tendency to complex with the ionizable salt in the complex than does the organometallic compound used in initially forming the complex. The organometallic compounds are those compounds in which the free valencies of the metal are satisfied by monovalent hydrocarbon radicals including alkyl, alkenyl, cycloalkyl, cycloalkenyl, arylalkyl and alkaryl. It is preferred that the hydrocarbon substituents do not have more than about 8 carbon atoms since the liquid organometallic compounds thereby defined have greater solubility for the oxide contaminant and are more readily recovered in separation operations. Thus among the organometallic compounds which can be employed are included for example triethylaluminum, trimethylaluminum, triphenylantimony, dipropylberyllium, trimethylbismuth, trimethylgallium, tetraethyllead, diphenylmercury, ditolylmercury, diethylmagnesium, tetraethylsilane, tetrapropylgermanium, tetraethylgermanium, dibenzyldiethylstannane, tetraethyltin, and the like.

Among the liquid aliphatic hydrocarbons are included the acyclic and alicyclic hydrocarbons, especially those having more than about 5 carbon atoms and generally not more than about 18 carbon atoms. Among such solvents are included for example, pentane, hexane, octane and the like, up to and including octadecane and the various branched chain isomers thereof; 1-octene, 1-7-octadiene and the like olefinic hydrocarbons, cyclohexane, methyl cyclohexane, cyclohexene, and the like cyclic hydrocarbons. Likewise, mixtures of aliphatic hydrocarbons can be employed, as for example, gasoline, white oil, and the like.

Among the general criteria of choice of the extractants are that they be liquid under ordinary conditions, essentially immiscible with the electrolyte and have solubility for the partially oxidized contaminants. The organometallic compounds are particularly preferred because they are more efficient and more dense and thus more readily recovered. The organometallic compounds are also preferred over the hydrocarbons because, being more dense than the electrolyte, the extract phase separates to the bottom and is readily withdrawn whereas when employing the hydrocarbons, the extract phase is above the electrolyte and effective separation is more difficult. Although not essential, it is preferred to employ as the extractant an organometallic compound of a metal other than the metal of the organometallic compound from which the complex is prepared. Of the organometallic compounds, those of lead and tin are especially suitable since these are stable toward water and can therefore be easily purified for reuse as will be pointed out in more detail below. This advantage is significant since the other organometallic compounds will hydrolyze with water and therefore must be purified by more complex techniques such as distillation and the like.

As set forth above the materials which can be purified according to the process of this invention are, in general, impure organometallic complexes contaminated with organometallic oxide compounds. The process is particularly applicable to electrolytes which comprise a complex of an organometallic compound and an ionizable salt. In other words, the process of this invention is applicable to any of the complexes which are formed from an organometallic compound and an ionizable salt. In general, the organometallic compounds which form such complexes are those of the metals of groups II–A and B, group III–A and groups V–A of the periodic system of the elements. These metals include for example, aluminum, magnesium, zinc, cadmium, mercury, gallium, indium, thallium, and beryllium, the valences of these metals being satisfied by monovalent hydrocarbon radicals. The ionizable salts include the halides, mercaptides, and alkoxides of the metals of groups I and II of the periodic table, and the hydrides of group I metals. Thus among the ionizable salts employed are sodium fluoride, potassium fluoride, calcium chloride, barium iodide, magnesium bromide, and the like halides of the groups I and II metals and their corresponding alkoxides and mercaptides such as sodium ethylate, lithium phenolate and the like, and potassium ethyl mercaptide, lithium ethyl mercaptide and the like. The complexes which are particularly preferred are those formed from the organoaluminum compounds and the alkali halides, particularly the alkali fluorides. Of these, triethylaluminum and sodium fluoride are especially preferred since the complex formed therefrom has been found to be a particularly effective electrolyte in producing tetraethyllead by electrolysis.

The complex is generally formed by adding the salt to the organometallic compound, usually with heat, under an essentially inert atmosphere such as nitrogen, helium, and the like. It is in the preparation and handling of these materials that the oxide contaminants are formed or are inherently present. Likewise, these oxide contaminants will form upon exposure of the electrolyte to the atmosphere. As examples of the oxide contaminants present are included, in the case of aluminum compounds, aluminum diethylethoxide, aluminum ethyldiethoxide and aluminum triethoxide. Similar such contaminents are found in the other organometallic compounds described previously.

The following examples illustrate the present invention but should not be construed as in any way limiting. All parts are by weight.

*Example I*

An electrolyte was prepared by adding, under a nitrogen atmosphere, 84 parts of triethyl aluminum to a nitrogen purified vessel equipped with a means for agitation and external heating means. Sodium fluoride, 16 parts, was added in proportions from a holding vessel attached to the reaction vessel while maintaining the temperature of the mixture at 80° C. and with agitation until all of the sodium fluoride had dissolved. During all operations every effort was made to prevent contamination of the product.

A sample of the electrolyte thus prepared was analyzed and its purity was found to be 73% sodium fluoride ditriethyl aluminum complex [$NaF \cdot 2Al(C_2H_5)_3$], the impurity being principally alkylaluminum ethoxides and aluminum ethoxide.

About 4 parts of this electrolyte maintained under a nitrogen atmosphere was added to a closed mixing vessel having an outlet at the bottom and an inlet at the top, and a means for agitation. Then 1 part of tetraethyllead was added thereto with agitation for 5 minutes. The agitation was stopped and the tetraethyllead immediately settled and was withdrawn from the vessel. This operation was repeated 5 times although such is not ordinarily necessary since the first extraction removes essentially all of the ethoxide contaminant. The extracted complex was again analyzed and found to be greater than 90% pure, containing less than 10% by weight ethoxide contaminant. The combined tetraethyllead extract was washed with slightly acidified water which removed the oxide contaminant therefrom and upon separation, the tetraethyllead was reused for extraction.

*Example II*

In this run a triisopropyl aluminum-sodium fluoride complex is prepared as described in the preceding example and then extracted as set forth therein. Essentially pure complex is obtained, the oxide contaminants being removed.

*Example III*

A complex of triphenylaluminum and sodium fluoride is prepared as in Example I with the exception that the temperature employed is 95° C. It is then extracted with 12 parts of tetraethyllead, at 60° C. in one step. The complex is essentially free of oxide contaminants.

*Example IV*

Diethylmagnesium is complexed with sodium fluoride as in Example I. The complex is then extracted with tetraethyllead at 60° C. Essentially all ethyl magnesium ethoxide and magnesium diethoxide contaminants are removed.

*Example V*

Similar results are obtained when extracting a complex of sodium fluoride with diethylzinc, diethyl cadmium, diphenylmercury and triethyl thallium, according to Example IV.

*Example VI*

Another batch of complex is prepared as in Example I and extracted with 15 parts of hexane in one step. In this instance the extract phase is drawn from the top of the reaction vessel and the electrolyte is found to be essentially free of ethoxide contaminant. The hexane extract is washed with an equal portion of water with agitation and then upon setting, the hydrocarbon phase is separated essentially free of the oxide contaminant.

Example VII

Examples I through V are repeated and similar results are obtained when employing methyl triethyllead, tetraisobutyl lead, tetramethyllead, dimethylzinc, diethylmagnesium and tetraethyltin as the organometallic extractants. When employing the organometallic compounds other than those of lead or tin, the organometallic compound is recovered for reuse by distillation rather than washing with water.

Example VIII

Example VI is repeated and similar results are obtained when employing as solvent liquids octane, cyclohexane, cyclohexene, and mixed hydrocarbons as heavy alkylate, gasoline, and other mixtures of paraffinic hydrocarbons.

In all of the above illustrations sodium fluoride was employed as the ionizable salt. In these examples similar results are obtained when sodium fluoride is substituted with potassium bromide, lithium iodide, sodium methylate, calcium fluoride, sodium hydride, potassium butyl mercaptide, and the like ionizable salts described hereinbefore.

In the Examples I through VIII there is demonstrated the use of various extractants at particular extraction temperatures. Similar results are obtained when the extraction is conducted up to a temperature approaching the decomposition temperature of the electrolyte or the extractant. Generally temperatures between about 15 to 60° C. are suitable, although the range normally employed is between room temperature and 40° C.

Likewise, in the aforementioned examples various amounts of the extractants are employed. In general between 5 to 25% by weight based on the electrolyte is used and preferred. It is to be understood that some purification is obtained when extracting with lesser amounts of the extractants however, such are not desirable since the removal of contaminants will be less. Likewise appreciable quantities, above about 25% by weight, have generally not been found necessary in the extraction. Therefore in the examples presented, 5, 10, and 20% by weight of the extractant based on the electrolyte can be substituted for the amounts employed therein to produce effective purification.

The time of contact of the extracting liquid with the electrolyte is not critical particularly when efficient agitation is provided. In general, periods between about 1 minute to 1 hour are sufficient and can be employed. In a preferred embodiment, efficient agitation is provided to result in intimate and essentially uniform contact of the extractant with the electrolyte. Likewise various modes of conducting the extraction can be employed other than that employed in the aforementioned examples. For example, a continuous countercurrent extraction system is particularly suitable.

During the extraction an inert atmosphere is usually maintained. Particular inert atmospheres which can be employed are nitrogen, argon, helium and the like inert gases. Such prevent contamination from the atmosphere when a completely enclosed system is not employed.

As set forth in the examples, the extract is removed from the system by simple techniques such as decantation. Upon removal of the extract in the case of the hydrocarbons, organolead and tin compounds, these can be readily purified for reuse simply by washing with water. The water dissolves the oxide impurities from the hydrocarbon or the aforementioned organometallic compounds and they can then be readily separated. It is preferred to employ water which has been made slightly acidic or basic by the use of acids such as sulfuric, hydrochloric, and the like, or bases such as sodium hydroxide, sodium carbonate and the like. The addition of these materials eliminates the formation of the dissolved oxides as gels, thus permitting more effective separation.

When employing as the extractant organometallic compounds other than those of lead and tin, if it is desired to recover the organometallic compound, such can be done by distillation or fractional crystallization. These materials cannot be washed with water since they are readily hydrolyzed and would therefore not be reusable.

The electrolytes which have been purified as described above are particularly suitable for employment in electrolysis processes for the production of organolead compounds, particularly tetraethyllead. Briefly such processes involve passing an electric current through a lead anode and the aforementioned electrolytes. In conducting such an electrolysis employing electrolytes not purified according to the present invention, the current efficiencies were low and a considerable delay in formation of the product occurred during the electrolysis. The following example will demonstrate the improvements when employing as the electrolytes, materials which have been purified according to the present invention.

Example IX

The apparatus employed was an electrolysis cell provided with a lead anode and a copper cathode. To the cell was added 600 parts of electrolyte prepared as in Example I but not purified. Current was then supplied to the electrolyte so that the current density was maintained at 0.022 ampere/cm.$^2$. The electrolyte was maintained at a temperature between 28 to 45° C. Tetraethyllead was not formed until a period of 10¾ hours had elapsed, and after this period, when electrolysis continued an additional 5¼ hours at 1 ampere, the current efficiency was 16½% with only 6.6 parts of tetraethyllead being produced. Current efficiency was measured by determining the ratio of tetraethyllead produced to the theoretical production based on the current flow.

In contrast to the results obtained above, a portion of the electrolyte which had been purified as described in Example I was electrolyzed as set forth above with the exception that the temperature was maintained between 23 to 37° C. Upon application of the current, product tetraethyllead was seen to form on the anode instantaneously and at the completion of 5½ hours operating time, 38 parts of tetraethyllead had been continuously removed. The current efficiency was 87%.

Example X

The electrolysis of Example IX is repeated except that the purified electrolyte in Example II is employed. The electrolysis is conducted at 50° C. using dioxane as a solvent. Again essentially no delay is exhibited in the electrolysis to produce tetraisopropyl lead.

Example XI

The purified electrolyte of Example III is electrolyzed at 80° C. using benzene as a solvent. Again the production of tetraphenyllead is essentially instantaneous upon the application of the current.

Example XII

When a complex of sodium fluoride with diethylmagnesium purified as in Example IV, or with diethylzinc, the complex being purified as in Example V, or with triethylaluminum purified as in Example VI, is electrolyzed at 30° C. as described in Example IX, tetraethyllead formation starts immediately.

The temperature during electrolysis is not critical. It should be sufficiently high to give reasonable reaction rates but should not be appreciably above the decomposition temperature of the organometallic reactants or the organolead products. Thus, the operating temperature of the reaction depends upon the particular organometallic compounds involved. In general, suitable temperatures are between about 0° and about 120° C., but temperatures from about 20°–50° C. are preferred for maximum current efficiency and best results. Suitable results are obtained in the above examples at temperatures of 20, 40, and 90° C. Higher temperatures can be employed when using known organolead thermal stabilizers. Typical examples of such stabilizers are alkyl-substituted aromatic hydrocarbons, such as toluene and xylene; condensed aromatic hydrocarbons, such as naphthalene; and conjugated dienes.

Atmospheric pressure is normally employed. While subatmospheric pressures are permissible, the affinity of the reactants for moisture and oxygen usual makes this operation hazardous and impractical. In some instances, supra-atmospheric pressure is preferred, particularly when employing a relatively high temperature and a relatively volatile solvent or an electrolyte containing a relatively unstable salt, e.g., a hydride. Also, a pressure of inert gas is sometimes desirable, for example to assure anhydrous conditions. When gas is employed, the pressure can range from atmospheric up to about 100 atmospheres. Pressures of 10, 20, and 50 atmospheres, where atmospheric pressure was employed in the above examples, give satisfactory results.

In some instances various solvents can be employed during the electrolysis step. The principal requirement for the solvent is that it dissolve the electrolyte. The use of a solvent however is not essential to the operation of the process and its absence may be desirable in some instances. Thus when electrolyzing the electrolyte in the absence of a solvent, the organolead compound is generally insoluble and separates as a distinct phase which can easily be recovered. When a solvent is employed, it is not necessary that the organolead product be soluble in the solvent but with most solvents this is the case. When the organolead product is insoluble in the solvent system, it can be recovered directly from the cell as a separate phase. In this case it is generally desirable to withdraw a part of the solvent-containing electrolyte, either continuously or periodically, to use as a solvent for the fresh electrolyte feed. In general, solvents suitable are the polyethers (including cyclic ethers), tertiary amines, other organometallics, amides and substituted amides, and hydrocarbons, particularly the aromatic hydrocarbons. Typical examples of a few suitable solvents are illustrated in the above examples. Similar results are obtained when these examples are repeated with triisopropyl amine, formamide, toluene, xylene, and the like. Additional typical examples of suitable solvents are ethers, such as dimethyl ether, methylethyl ether, methyl-n-propyl ether, and mixtures of these. Suitable polyethers are ethylene glycol diethers, such as methyl-ethyl, diethyl, ethylbutyl, and dibutyl; diethylene glycol ethers, such as dimethyl, diethyl, ethylbutyl and butyl lauryl; trimethylene glycol ethers, such as dimethyl, methylethyl; glycerol ethers, such as trimethyl, diethyl methyl, etc.; and cyclic ethers, such as dioxane and tetrahydrofuran. Typical amines suitable for this invention include aliphatic and aromatic amines and heterocyclic nitrogen compounds. The preferred tertiary amines for use in this invention are trimethyl amine, dimethyl ethyl amine, tetramethyl ethylene diamine and n-methyl morpholine. Primary and secondary amines can also be used, such as methyl amine, dimethyl amine, etc.

The lead anode can be pure lead or alloys thereof of varying shapes. Typical examples of alloy metals are tin, bismuth, cadmium, antimony and copper. In some cases sodium, lithium, magnesium, and zinc are suitable. Likewise the lead or lead alloys can be coated or impregnated on a conductive metal, either metallic or nonmetallic, such as graphite. The cathode can be any suitable conductive metal but is preferably one which does not alloy with the metal produced.

The voltage and amperage necessary for the reaction depend upon the particular organolead compound being formed, as well as upon the specific resistance of the cell. In general, the potential across the electrodes should be between about 2 and 50 volts, although not greater than 20 volts is normally required or desirable. Preferably, a potential of 4–15 volts is employed. The conversion of lead is essentially 100 percent of theory. In general, not greater than 0.25 ampere/sq. cm. is employed. A preferred range is between 0.02 to 0.1 ampere/sq. cm.

The purification and the electrolysis steps are readily adapted to continuous operation. In particular, an initial batch of the electrolyte is continuously purified as in Example I but employing countercurrent flow and fed to the electrolytic cell as described in Example IX. The electrolysis is initiated as described therein and during the electrolysis and concurrently therewith, fresh electrolyte is continuously purified by passing the extractant therethrough and the thus purified electrolyte is continuously fed as makeup to the electrolytic cell with product tetraethyllead being continuously removed from the cell at essentially the same rate of feed.

Various suitable methods for the preparation of the organometallic compounds are disclosed in an article by Reuben G. Jones and Henry Gilman, Chemical Reviews, vol. 54, October 1954, No. 5, pp. 835 et seq.

I claim:

1. A process for the purification of an impure electrolyte comprising a hydrocarbon metal compound, wherein the valences of the metal are satisfied with monovalent hydrocarbon radicals, complexed with an ionizable salt, said electrolyte being contaminated with hydrocarbon metal oxide compounds, which comprises contacting said electrolyte with a liquid extractant selected from the group consisting of hydrocarbon metal compounds and aliphatic hydrocarbons having solubility for said contaminants therein and being essentially immiscible with said electrolyte.

2. The process of claim 1 wherein said electrolyte is a complex of triethylaluminum and sodium fluoride, and said liquid extractant is tetraethyllead.

3. The process of claim 1 wherein said extractant is an aliphatic hydrocarbon.

4. In a process for producing hydrocarbon lead compounds which comprises passing an electric current from a lead anode to a cathode in an electrolyte containing a complex of a hydrocarbon metal compound, wherein the valences of the metal are satisfied with monovalent hydrocarbon radicals, and an ionizable salt, the improvement comprising extracting said electrolyte prior to electrolysis with an extracting liquid selected from the group consisting of hydrocarbon metal compounds and aliphatic hydrocarbons having solubility for hydrocarbon metal oxide contaminants therein and being essentially immiscible with said electrolyte.

5. The process of claim 4 wherein said extracting liquid is tetraethyllead.

6. The process of claim 4 wherein said extracting liquid is hexane.

7. In a process for producing tetraethyllead which comprises passing an electric current from a lead anode to a cathode in an electrolyte comprising a complex of triethylaluminum and sodium fluoride, the improvement comprising intimately contacting said electrolyte prior to electrolysis with tetraethyllead at a temperature between about 15 to 60° C. and separating the tetraethyllead phase.

References Cited in the file of this patent

UNITED STATES PATENTS 2,473,434    Lindsey _____ June 14, 1949
2,517,692    Mavity _____ Aug. 8, 1950

OTHER REFERENCES

Jones et al.: "Chemical Reviews," vol. 54 (October 1954), pages 844–846.